United States Patent [19]

Barrett

[11] 3,999,854

[45] * Dec. 28, 1976

[54] SIMULTANEOUS INTERFEROMETRIC TRANSMISSION OF PERIODIC SPECTRAL COMPONENTS

[75] Inventor: Joseph J. Barrett, Morris Plains, N.J.

[73] Assignee: Allied Chemical Corporation, Morris Township, N.J.

[ * ] Notice: The portion of the term of this patent subsequent to Dec. 10, 1991, has been disclaimed.

[22] Filed: Nov. 26, 1974

[21] Appl. No.: 527,465

Related U.S. Application Data

[63] Continuation-in-part of Ser. No. 373,576, June 25, 1973, Pat. No. 3,853,404, which is a continuation-in-part of Ser. No. 280,378, Aug. 14, 1972, abandoned.

[52] U.S. Cl. .............................. 356/75; 356/106 S
[51] Int. Cl.² ...................... G01J 3/44; G01B 9/02
[58] Field of Search .............. 356/106 IS, 75, 106 S

[56] References Cited

UNITED STATES PATENTS 3,853,404   12/1974   Barrett .......................... 356/106 IS

*Primary Examiner*—Vincent P. McGraw
*Attorney, Agent, or Firm*—Ernest D. Buff

[57] ABSTRACT

Light having spectral components periodic in frequency is collected, collimated and transmitted by a light conditioning means. Secondary interferometric means, adapted to receive the light, selectively separate preselected spectra therefrom and send the light devoid of the separated spectra to a primary interferometric means. The primary interferometric means selectively separates periodic spectra from the light and transmits such spectra in the form of a fringe which provides a detectable signal. A multipass means directs the signal back through the primary interferometric means, whereby the contrast ratio of the signal is increased. A modulating means modulates the phase difference between interfering rays of light transmitted by the primary interferometric means so as to vary the intensity of the fringe. The intensity variation of the fringe is detected by a phase sensitive detection means, and the resultant signal is displayed by an indicating and recording means. Advantageously, each of the spectral lines is transmitted simultaneously. Thus, the detected signal is derived from a plurality of spectral lines and has an intensity substantially equal to their sum.

82 Claims, 4 Drawing Figures

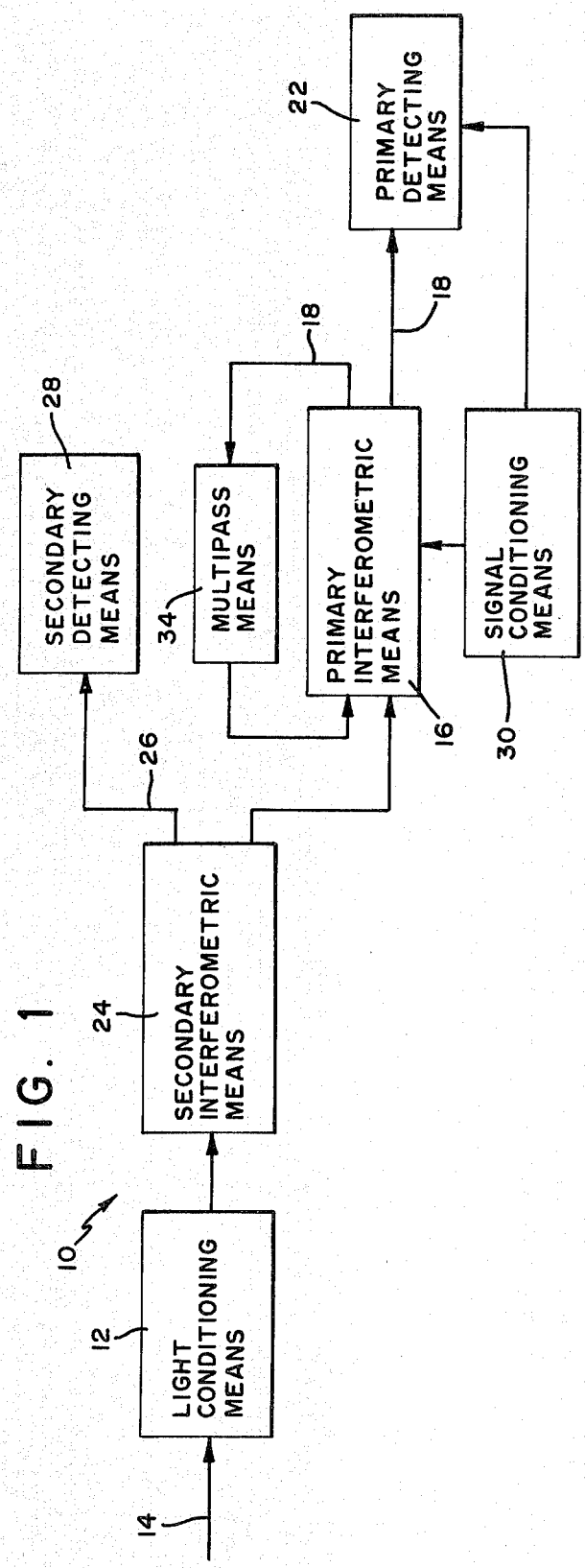
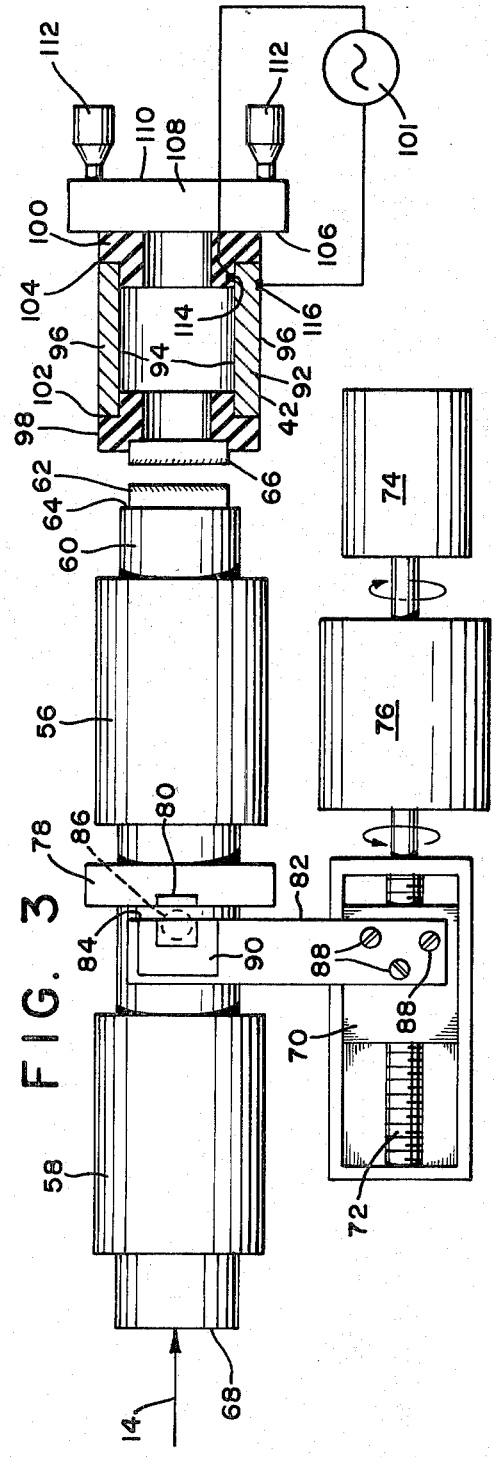

SIMULTANEOUS INTERFEROMETRIC TRANSMISSION OF PERIODIC SPECTRAL COMPONENTS

CROSS-REFERENCE TO RELATED APPLICATIONS

This application is a continuation-in-part of my copending application Ser. No. 373,576, filed June 25, 1973 entitled "Simultaneous Interferometric Transmission of Periodic Spectral Components" now U.S. Pat. No. 3,853,404 which, in turn, is a continuation-in-part of my copending application Ser. No. 280,378, filed Aug. 14, 1972, entitled "Interferometric Transmission of Periodic Spectra", now abandoned.

BACKGROUND OF THE INVENTION

This invention relates to the field of spectroscopy and more particularly to apparatus for the detection and quantitative measurement of gaseous constituents through the selective transmission of their periodic spectra.

DESCRIPTION OF THE PRIOR ART

Fabry-Perot interferometers have been used for high resolution spectroscopic studies. To prevent overlapping of orders, the interferometer is conventionally employed in series with a spectrograph whose passband is adjusted to match the spectral range of the interferometer. Such spectral range is inversely proportional to the plate separation and resolving power of the interferometer, and becomes very small when resolving power is high. Ordinarily, no more than an isolated portion of the spectrum can be viewed at one time and the interferometer scan is limited to a few orders. The detected signal is derived from and corresponds in magnitude to the intensity of a single spectral line. For very weak spectra such as those obtained from light scattering in gases, the intensity is usually far below the magnitude considered acceptable for commercial applications.

One of the major problems in the field of spectroscopy is the difficulty of detecting and quantitatively measuring gaseoud costituents. Among the optical methods previously proposed for this purpose, Raman scattering is considered to be promising. The Raman lines of a molecule are shifted from the frequency of the incident light by characteristic rotational and vibrational frequencies specific to the scattering molecule. Rotational Raman lines, although far more intense than vibrational Raman lines, overlap considerably in the region of the exciting line and have therefore not been used to detect and measure quantitatively gaseous constituents. Vibrational Raman lines generally do not overlap and therefore permit interference-free detection of certain gaseous constituents. However, such lines are insufficiently intense for detection at distant locations of gaseous constituents present in the low parts per million range. For the above reasons, vibrational Raman scattering is often too insensitive for field detection of gaseous constituents such as atmospheric pollutants.

SUMMARY OF THE INVENTION

Means have been developed for increasing the sensitivity of apparatus for the selective transmission of periodic spectra. Light having spectral components periodic in frequency is transmitted through an interferometric means and analyzed without additional filtering means such as spectrometers, interference filters and the like. Such interferometric means has interference-producing means for providing a plurality of transmission windows regularly spaced in frequency. The frequency spacing between adjacent windows, or spectral range, of the interferometric means is adjusted to substantially equal an odd integral submultiple, n, of the frequency difference between adjacent spectral components of the same periodic spectrum, said odd integral submultiple being at least three. Under these circumstances, the interferometric means forms a comb filter. The interferometric means also has scanning means for causing the transmission peaks for adjacent nth orders to coincide with the spectral lines of the components. Apparatus is thereby provided for selectively spearating periodic spectra from the light. The separated spectra are transmitted by the interferometric means in the form of a fringe which provides a detectable signal. Advantageously, each of the spectral lines is transmitted simultaneously, and the detected signal is derived in part from the combined intensities of the periodic spectral lines.

Although the light which is subjected to analysis can be received from an external source, it is usually produced by the apparatus. For example, when used to measure rotational Raman spectra of gaseous material, the apparatus preferably has light source means for generating monochromatic light. A projecting means associatated with the light source means directs the monochromatic light through the gaseous material to produce scattered light having spectral components periodic in frequency. Light conditioning means are provided for collecting, collimating and transmitting the scattered light to an interferometric means of the type described. The interferometric means transmits the periodic spectral components of the light in the form of a detectable signal, the intensity of which is indicated by a detecting means.

Several known interferometric means may be adapted for use with the above apparatus. Preferably, the interferometric means is a Fabry-Perot Interferometer (FPI) having a mirror separation, $d$, adjusted to transmit simultaneously all rotational lines of a molecular species or gaseous constituent, of the gaseous material. This condition obtains when $$d = n/8\mu B$$

where $d$ is the mirror separation of the FPI, $n$ is an odd integer, $\mu$ is the index of refraction of the medium between the mirrors, and $B$ is the molecular rotational constant of the species. For a given molecular species, the rotational constant $B$ is a unique quantity. Thus, identification of the species emitting a particular rotational Raman spectrum is made positively by determining the mirror separation of the FPI at which all the rotational Raman lines of the species are simultaneously transmitted. Advantageously, the throughput of the FPI is considerably greater than that for a spectrometer. Moreover, the detected signal is derived in part from a plurality of periodic spectral lines each generally having an intensity considerably greater than that of the species' vibrational spectra. Accordingly, the intensity of the detected signal, and hence the accuracy of the apparatus, is far greater than that obtained by apparatus for measuring vibrational Raman scattering of gaseous material.

It has been discovered that certain improvements may be made in the above apparatus, whereby its accuracy is substantially increased. Such improvements can be especially useful for detecting and quantitatively measuring minor constituents of a gaseous material, such as air. a first improvement comprises signal conditioning means, including: modulating means associated with the interferometric means, hereinafter referred to as the primary interferometric means, for modulating the phase difference between interfering rays of the light so as to vary the intensity of the fringe, the modulating range being no greater than the frequency spacing between adjacent orders, and synchronous (e.g. phase sensitive) detection means for detecting the intensity variation of the fringe, whereby the fringe can be identified. A second improvement comprises at least one secondary interferometric means located in series with and between said light conditioning means and said primary interferometric means for receiving light having components periodic in frequency, selectively separating from said light preselected periodic spectra (such as the periodic spectra of a major constituent of said gaseous material) and sending said light devoid of such separated spectra to said primary interferometric means, said secondary interferometric means having interference-producing means for providing a plurality of transmission windows regularly spaced in frequency, the frequency spacing between adjacent windows of the secondary interferometric means being adjusted to substantially equal the frequency difference between adjacent spectral components of the periodic spectrum for the separated spectrum, and scanning means for causing the transmission peaks for adjacent orders of said secondary interferometric means to coincide with the spectral lines of the latter components. When the first and second improvement means are combined, detection means of the low light level (photon counting) variety can be employed for increased sensitivity. In a third improvement, the interferometric means has multipass means for directing the detectable signal through the primary interferometric means whereby the contrast ratio of the signal (i.e. the ratio of the maximum transmitted intensity to the minimum transmitted intensity), and hence the sensitivity of the apparatus is greatly increased. Although each of the three improvements may be used individually with the above-described apparatus, they are preferably combined for maximum sensitivity of the apparatus. In its preferred embodiment, the apparatus of the present invention permits detection and quantitative identification of gaseous constituents present in amounts as low as one part per million or less at locations as far as five miles distant therefrom.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 1 is a block diagram showing means for increasing the accuracy of apparatus for the selective transmission of periodic spectra;

FIG. 3 is a side view, partially cut away, showing means for modulating the primary interferometric means of FIGS. 1 and 2.

DESCRIPTION OF THE PREFERRED EMBODIMENTS

Figure 2:
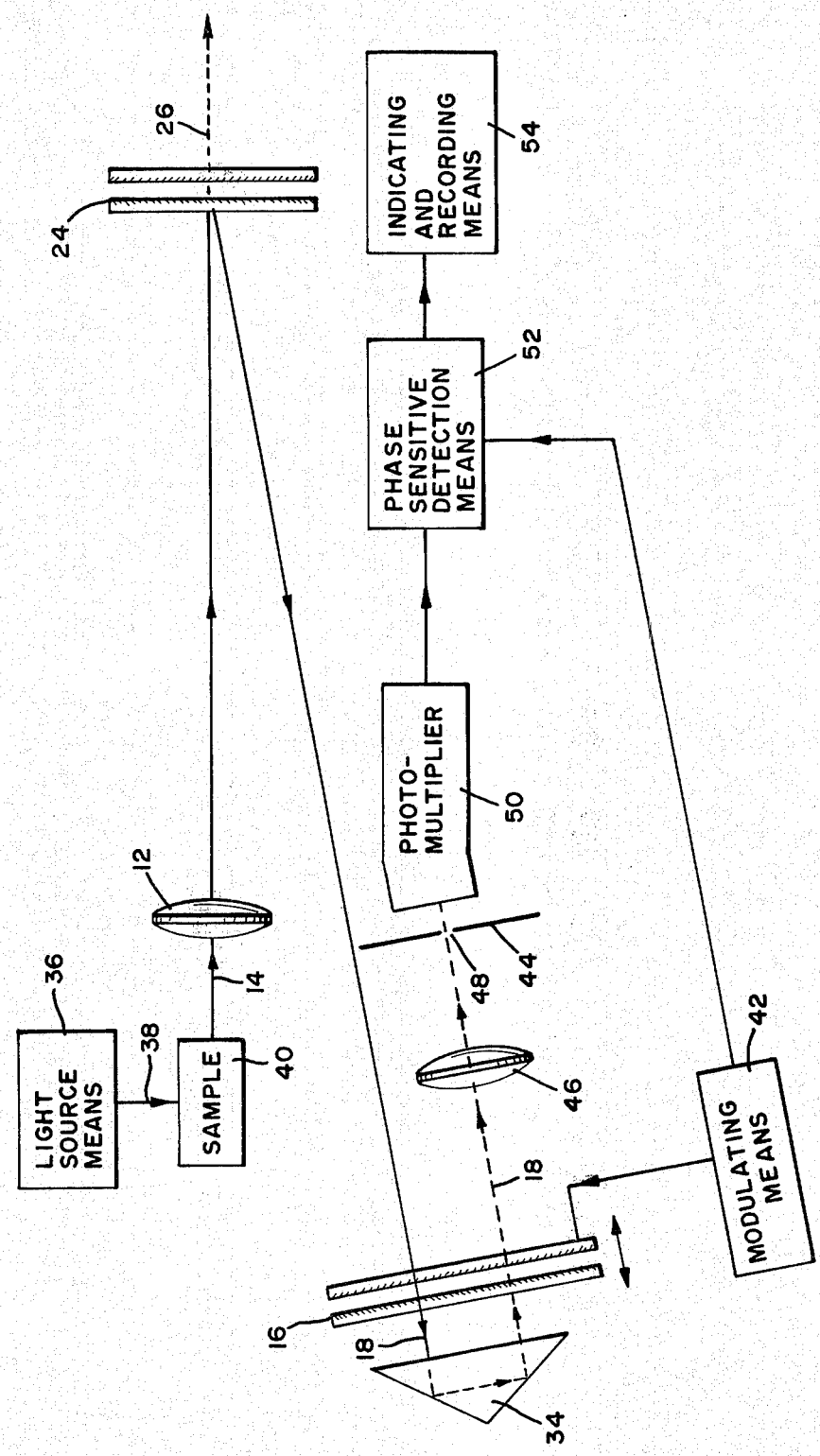
FIG. 2 is a schematic diagram of the means of FIG. 1, including, additionally, means for producing light carrying such spectra.

Light having spectral components periodic in frequency is found in each of the visible, infrared and ultraviolet frequency regions, at intensities sufficient to permit detection of the components. As a consequence, the invention will function with light having a relatively wide range of frequencies. For illustrative purposes, the invention is described in connection with apparatus for measuring rotational Raman spectra of gaseous material scattered by light from the visible frequency region. When applied in this manner, the invention is particularly suited to detect and to measure quantitatively minor constituents of a gaseous material such as air. It will be readily appreciated that the invention can be practiced using light from any of the foregoing frequency regions, and that it can be employed for similar and yet diversified uses, such as the analysis of vibration-rotation spectra, the determination of molecular gas constants and the like.

Referring to FIG. 1 of the drawings, there is shown preferred apparatus for the selective transmission of periodic spectra. In the basic apparatus, shown generally at 10, light conditioning means 12 collect, collimate and transmit light 14 having spectral components periodic in frequency and primary interferometric means 16 receives the light 14, selectively separates periodic spectra therefrom and transmits the spectra in the form of a fringe which provides a detectable signal 18.

More specifically, a secondary interferometric means 24, connected in series with and between the light conditioning means 12 and the primary interferometric means 16, receives the light 14, selectively separates therefrom preselected periodic spectra, and sends the light 14 devoid of the separated spectra to the primary interferometric means 16. The separated spectra are transmitted from the secondary interferometric means 24 in the form of a fringe which provides a detectable signal 26. Secondary detecting means 28 is adapted to receive the signal 26 and determine the intensity thereof. A signal conditioning means 30 is associated with the primary interferometric means 16 and a primary detecting means 22. The signal conditioning means 30 has modulating means for modulating the phase difference between interfering rays of light 14 transmitted by the primary interferometric means 16 so as to vary the intensity of the fringe transmitted thereby. Signal conditioning means 30 also has synchronous (e.g. phase sensitive) detecting means for detecting the intensity variation of the latter fringe, whereby the fringe can be identified by the primary detecting means 22. A multipass means 34 is associated with the primary interferometric means 16. The multipass means directs signal 18 through the primary interferometric means 16, whereby the contrast ratio of the signal 18 is increased.

FIG. 2 schematically shows the apparatus of FIG. 1, including, additionally, means for producing light carrying periodic spectra. As previously noted, the light 14 which is subjected to analysis can be received from an external source. Generally, however, the light 14 is produced by the apparatus 10. Hence, the apparatus 10 has light source means 36, such as a conventional argon ion laser, a frequency doubled, pulsed ruby laser or the like, for generating a highly monochromatic, coherent, collimated beam of radiation. The resolving power of the interferometric means 16 is best utilized when the light source means 36 is provided with means for projecting light having a line width and frequency stability about equal to or less than the instrumental width, described hereinafter in greater detail, of the interferometric means 16.

The use of a pulsed laser as the light source means 36 together with a time gated electronic detection system permits determination of pollutant concentration and location of a sample of gaseous material remote from the apparatus 10. For example, by providing the apparatus 10 with (1) means for measuring the time interval required to send a laser pulse into the sample and receive a return signal cuased by light scattered therein and (2) means for measuring the amplitude of the return signal, the distance of the sample from the apparatus 10 as well as the pollutant concentration thereof is readily obtained. A pulsed laser adapted to determine pollutant concentration and location in the above manner preferably has means for projecting light having a line width and frequency stability about equal to or less than the instrumental width of the interferometric means associated therewith. Such means typically includes a mode selecting etalon disposed in the laser cavity.

A projecting means associated with the light source-means 36, introduces the radiation, schematically represented by ray path 38, into gaseous material in sample compartment 40 in one direction, which will be considered to be substantially vertical for convenience in referencing directions, but may, of course, be in any direction desired. Raman scattered radiation hereinafter referred to as light 14, from the gaseous material in sample compartment 40 is collected, collimated and transmitted to the secondary interferometric means 24 by light conditioning means 12, which may be a lens, or other suitable optical system. As long as the gaseous material contains molecules which are of the linear or symmetric top variety, the light 14 will exhibit spectral components periodic in frequency.

The secondary interferometric means 24 has interference-producing means for providing a plurality of transmission windows regularly spaced in frequency. In addition, the secondary interferometric means 24 has scanning means for variably controlling the frequency of each order. The interference-producing means is adjusted so that the frequency spacing between adjacent windows substantially equals the frequency difference between adjacent spectral components of the periodic spectrum for the preselected spectra. Generally such preselected spectra are those produced by scattering of a major constituent of the gaseous material as, for example, the rotational Raman spectra of oxygen or niterogen in a sample of air. The scanning means is then adjusted so that the transmission peaks for adjacent orders coincide with the sprctral lines of such components. When the secondary interferometric means 24 is adjusted in the above manner, the preselected spectra are transmitted from te secondary interferometric means in the form of a detectable signal 26 and are thereby selectively separated from the light 14. The light 14 remaining is reflected from the secondary interferometric means 24 and thereby sent devoid of the separated spectra to the primary interferometric means 16. If desired, a secondary detecting means (shown in FIG. 1) can be used in conjunction with the secondary interferometric means 24 to indicate the intensity of the signal 26. The magnitude of signal 26, produced by scattering of a known concentration of a major gaseous constituent in a sample, can then be compared with the magnitude of signal 18, produced by scattering of a minor gaseous constituent in the sample, in order to determine the concentration of the minor gaseous constituent. In this manner, the concentration of a minor gaseous constituent detected at a location remote from the apparatus 10 can be more accurately determined.

The primary interferometric means 16 has substantially the same construction as the secondary interferometric means 24. Hence, the primary interferometric means 16 has interference-producing means for providing a plurality of transmission windows regularly spaced in frequency, and scanning means for variably controlling the frequency of each order. The primary interferometric means is disposed in the path of light 14 reflected from the secondary interferometric means 24. Such primary interferometric means has an interference-producing means adjusted to that the frequency spacing between adjacent windows substantially equals an odd integral submultiple, $n$, of the frequency difference between adjacent spectral components of the same periodic spectrum, the odd integral submultiple being at least three. Generally, such a periodic spectrum differs from that of the spectral components separated from light 14 by the secondary interferometric means 24, and represents the spectrum produced by scattering a minor constituent of the gaseous material. The scanning means of the primary interferometric means 16 is then adjusted so that the transmission peaks for adjacent $n$th orders coincide with the spectral lines of the components. Under these circumstances, periodic spectra of the chosed spectrum are selectively separated from the light 14. The separated spectra are transmitted by the primary interferometric means 16 in the form of a fringe which provides a detectable signal 18. Each of the spectral lines is transmitted simultaneously, and the detected signal 18 is derived in part from the combined intensities of the periodic spectral lines.

Before describing how the apparatus of FIG. 2 can be used to determine the intensity of signal 18, it would be helpful to explain the construction and operation of the primary and secondary interferometric means 16 and 24. As noted several known interferometric means may be adapted to selectively separate periodic spectra from the light 14. Preferably, the interferometric means is a Fabry-Perot Interferometer (FPI) having a mirror separation, $d$, adjusted to simultaneously transmit all rotational lines of a molecular species of the gaseous material. The transmission function of an FPI ($I_t$) can be given by the Airy formula:

$$I_t = T^2[1+R^2-2R\cos\phi]^{-1}I_o$$

where $T + R + A = 1$, $I_o$ is the intensity of the incident light, and the phase difference $\phi$ is expressed as $\phi = 4\pi\mu\omega d$ for rays normal to the FPI mirrors. The symbols A, R and T represent, respectively, the absorbance reflectance and transmittance of the FPI mirrors, $\mu$ is the refractive index of the medium between the FPI mirrors, $d$ is the FPI mirror separation, and $\omega$ is the frequency of the incident light expressed in wavenumbers. When $\cos \phi$ is equal to unity, transmisson maxima for $I_t$ occur. Hence, $\phi = 2\pi m$, where $m$ takes on integral values and represents the order of interference. The transmisson maxima for $I_t$ are referred to in the specification and claims as transmission windows. For a specific value of the mirror separation, $d$, the FPI provides a plurality of transmission windows regularly spaced in frequency. The frequency spacing, $\Delta f$, between adjacent windows (or spectral range) of the FPI is $\Delta f = (2\mu d)^{-1}$. By varying the mirror spacing, $d$, of the FPI, $\Delta f$ can be adjusted to substantially equal an odd integral submultiple, $n$, of the frequency difference between adjacent spectral components of a specific periodic spectrum, the odd integral submultiple being at least three. If the rotational Raman spectrum of a gas is used as the periodic spectrum, the FPI will behave as a comb filter having its transmission windows matched to the given periodic spectrum so as to transmit all of the Raman lines of the spectrum and block the Rayleigh line when the mirror spacing is adjusted so that $\Delta f = 4B/n$, where $B$ is the rotational constant of a molecular species, or constituent of the gas. The Rayleigh line is blocked because it falls between two FPI transmission windows. Moreover, in the Raman spectrum, the Stokes and anti-Stokes Raman lines are symmetrically positioned around the Rayleigh line (at $\omega = \omega_o$). The first two Raman lines (having rotational quantum number, J, equal to zero) are shifted away from $\omega_o$ by a frequency of 6B, whereas the frequency separation of successive rotational lines is 4B. If the mirror separation, $d$, is changed by $$1/4\mu\omega_o$$

then the Rayleigh line will be transmitted by the FPI and all of the Raman lines will be blocked. Hence, continuous scanning of the FPI in the vicinity of $$d = n/8\mu B$$

produces an interferogram having a plurality of vertical lines of constant amplitude, which represent Rayleigh fringes at $\omega_o$, and a plurality of fringes corresponding to a superposition of all the rotational Raman spectral lines. When $\Delta f = 4/n$, the transmission peaks for adjacent $n$th orders coincide with the adjacent rotational Raman lines so as to produce a 1-to-1 correspondence therewith, and the amplitude of the Raman fringe transmitted is a maximum. For values of $\Delta f$ slightly different from $4B/n$, the transmission peaks for adjacent $n$th orders will not perfectly coincide with the Raman spectrum and the amplitude of the Raman fringe transmitted by the FPI will decrease.

Other rotational interferograms are produced when $\Delta f$ is equal to certain multiples of the rotational constant, $B$. The principle interferograms are produced when every rotational line is simultaneously transmitted by the FPI. Such principal interferograms are obtained for values of interferometer mirror separation $$d = n/8\mu B$$

where $n$ is an odd integer. Secondary interferograms are obtained when every other rotational Raman line or every third Raman line (and so on) coincides with the transmission peaks of the FPI. Such secondary interferograms are obtained for values of the interferometer mirror separation $$d = (8\mu Bn')^{-1}$$

where $n'$ is an integer of at least 2. For example, with $n'=2$, two Raman fringes appear between adjacent Rayleigh fringes, each Raman fringe being produced by the simultaneous transmission of alternate sets of rotational Raman lines. Similarly, for $n'=3$, three Raman fringes appear between adjacent Rayleigh fringes, each Raman fringe being produced by the simultaneous transmission of every third rotational Raman line. Other secondary interferograms, for which the Rayleigh fringes coincide with one set of Raman fringes, are obtained for values of the interferometer mirror separation $$d = (4\mu Bn'')^{-1}$$

where $n''$ is an odd integer of three or greater. For example, with $n''=3$, two Raman fringes appear between adjacent Rayleigh fringes, each Raman fringe being produced by the simultaneous transmission of every third rotational Raman line. A third Raman fringe, which is produced by the simultaneous transmission of every third rotational Raman line, is superimposed on the Rayleigh fringes.

In the case of the principal interferograms, the odd integer $n$ is directly proportional to the mirror spacing $d$. An upper limit on the value of $n$ is established when the spectral range of the primary interferometric means is approximately equal to the line width $\Gamma$ (full width at half intensity points) of the spectral components of the periodic spectrum. Therefore the maximum value of $n$ is $$n_{max} = 4B/\Gamma.$$

In the case of the secondary interferograms, the integers $n'$ and $n''$ are inversely proportional to the mirror spacing, $d$. Therefore, as $n'$ and $n''$ increase in value, the mirror spacing, $d$, becomes smaller. The upper limits on the values of $n'$ and $n''$ occur for values of the mirror spacing, $d$, in the vicinity of zero.

The importance of the principal interferograms for $n>1$ may be illustrated by the results of an experiment with nitrogen gas which was heated by an electrical discharge. The object of the experiment was to observe pure rotational Raman scattering from molecules in excited vibrational states in order to determine the relative populations of the vibrational states and hence the temperature of the electrically discharged nitrogen gas. The vibrationally excited nitrogen was produced by an electrical discharge and introduced into sample compartment 40, which comprised an intracavity gas cell equipped with Brewster angle windows. Compartment 40 was positioned at the focus of the light source means 36. The latter was an argon ion laser adapted to oscillate 514.5 nanometers with a circulating power of about 10–15 watts. Gas flow through compartment 40 was adjusted to obtain optimum discharge conditions. Gas pressure in compartment 40 ranged from 100 to 150 Torr. Light 14 scattered at 90° from the focal region of the laser beam was collected and collimated by light conditioning means 12 which comprised an $f/1.0$ camera lens. The scattered light 14 was analyzed by the primary interferometric means 16 which was a Fabry- Perot interferometer. Detectable signal 18, transmitted by the primary interferometric means was collected and focused in the plane of pinhole stop 44 by a lens 46. The intensity of the portion of signal 18, passing through the pinhole 48 of pinhole stop 44, was detected by a photomultiplier 50. A primary detecting means 22 comprising a pulse counting electronic system was adapted to receive the signal from the photomultiplier 50 and detect the intensity variation of the fringe appointed for analysis. The output of the detecting means 22 was measured and recorded. The output consisted of an interferogram which was produced by scanning one of the Fabry-Perot mirrors at a constant rate and recording the variations in the fringe intensity on a recorder. The scanning means employed was of the type described in connection with FIG. 3, except that mirror 62 was attached to a plate supported by three air bearings on three parallel rods. Linear displacement of mirror 62 was achieved by use of a pivotal drive bar connected to a motorized precision screw.

Figure 4:
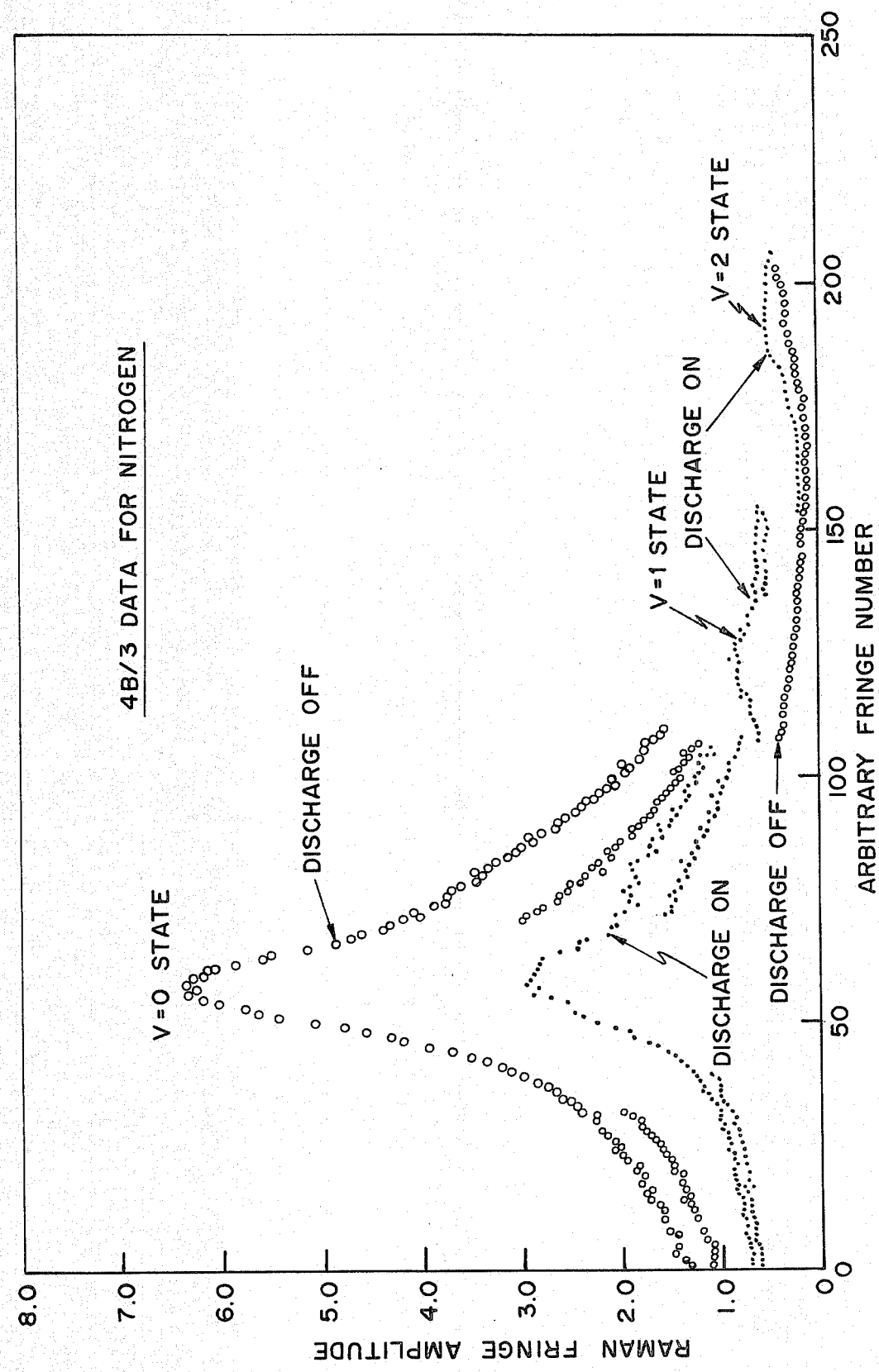
FIG. 4 is a graph showing peak amplitudes of Raman fringes for nitrogen gas molecules in excited and unexcited states.

The experimental results are shown in FIG. 4. The peak amplitudes of the Raman fringes are plotted under the conditions wherein the electric discharge was off (open circles) and the electric discharge was on (solid points). With the electric discharge off, only one fringe maxima was observed corresponding to molecules in the $v=0$ vibrational state. With the discharge on, two additional fringe maxima appear due to molecules in the $v=1$ and $v=2$ vibrational states. Molecules in different vibrational states, $v$, have slightly different rotational constants, $B_v$, as indicated by the following relation:

$$B_v = B_e - \alpha_e (v + \tfrac{1}{2}) + \ldots$$

where $B_e$ is the rotational constant for the non-vibrating molecule and $\alpha_e$ is the difference between rotational constants of neighboring $v$, i.e., $\alpha_e = B_v - B_{v+1}$. With the electric discharge on, sufficient population of the $v = 1$ and $v = 2$ vibrational states is obtained so as to permit direct observation of pure rotational Raman scattering from these vibrational states. Thus molecules in the $v = 1$ and $v = 2$ vibrational states should have rotational Raman spectra differing slightly with that from ground state molecules and the difference can be observed with the high resolution obtained with a high finesse Fabry-Perot interferometer (FPI). Simultaneous transmission by the FPI of essentially all the rotational Raman lines is realized for values of the FPI spectral range equal to $4B/n$, where $n$ is an odd integer. For $n = 1$, the interferometric resolution was insufficient to resolve the rotational Raman spectra from different vibrational states. With $n = 3$, however, a higher resolution was achieved with the result that the fringe patterns derived from the rotational Raman spectra from different vibrational levels were independently observed, as shown in FIG. 4. The data of FIG. 4 indicate that higher interferometric resolution is achieved as $n$ increases. This increase in resolution was used advantageously to improve the detection of the pure rotational Raman fringes arising from the different vibrational states. As the free spectral range approaches the value $4B_0/n$, a maximum of the Raman fringe intensity occurs due to pure rotational scattering in the ground vibrational state ($v = 0$). At slightly larger mirror spacings another set of Raman fringes (from molecules in the first vibrational state, $v = 1$) appears and maximizes at a displacement which is a measure of $\alpha_e$. The ratio of the intensity at the fringe maximum for $v = 1$ and that for $v = 0$ is related to the vibrational temperature.

Secondary interferograms which are obtained when every other rotational Raman line or every third Raman line (and so on) coincides with the transmission peaks of the FPI have been used advantageously to detect a minor gaseous constituent in a sample of air. For example, carbon dioxide, having a natural abundance in air of 300 ppm, was detected easily by using a spectral range of the FPI equal to 8B. Use of a spectral range of 8B minimized interference which would result from the transmission of rotational Raman lines of coexistent gases, such as nitrogen, if the spectral range were set at 4B. For certain homonuclear molecules, such as oxygen and carbon dioxide, alternate spectral components have zero intensity due to the effects of nuclear spin. In the above example for $CO_2$, the frequency spacing between adjacent windows, or spectral range, of the FPI was adjusted to substantially equal 8B, which is the product of the frequency difference between adjacent $CO_2$ spectral components (including those of zero intensity) and the integer $n'$ where $n'$ is equal to two. With the interferometer so adjusted, it is then scanned so as to cause the transmission peaks for adjacent orders to coincide with adjacent $n'$th spectral lines of the components. For the detection of other minor gaseous constituents in gases, such as air, spectral interference due to the presence of coexistent gases may be minimized by adjusting the spectral range of the FPI to substantially equal the product of the frequency difference between adjacent spectral components of the periodic spectrum for the species appointed for detection and the factor $n''/2$ where $n''$ is an odd integer of at least three. With the interferometer so adjusted, it is then scanned so as to cause the transmission peaks for alternate orders to coincide with adjacent $n''$th spectral lines of the components.

The transmission function of the FPI can be represented by the convolution of a nonperiodic function and a Dirac comb:

$$I(\phi) = \frac{T^2}{1 - R^2} \, \text{Ш}(\phi/2\pi) * \frac{2\rho}{\rho^2 + \phi^2}$$

where $\phi = 4\pi\mu\omega d$ is the phase difference, $\text{Ш}$ is the shah sampling function, or Dirac $\delta$ function comb, defined as:

$$\text{Ш}(x) = \sum_{n=-\infty}^{\infty} \delta(x - n)$$

and $\rho = -\ln R$. The shape of a single fringe is represented by the Lorentzian profile:

$$S(\omega) = \frac{T^2}{1 - R^2} \cdot \frac{2\rho}{\rho^2 + (4\pi\mu\omega d)^2}.$$

The intensity transmitted by the FPI when illuminated by a spectrum of distribution $J(\omega)$ is described by the formula:

$$F(d) = \int_0^\infty J(\omega) \, \text{Ш}(2d\mu\omega) * S(\omega) d\omega.$$

Let us define $J(\omega)$ to be a periodic spectrum such that:

$$J(\omega) = \sum_{n=-l}^{l} \delta(\omega - \omega_o - n\Delta\omega) A(\omega).$$

This is a spectrum having $(2l+1)$ lines of zero width centered around the frequency $\omega_o$. Adjacent lines in the spectrum are separated by the frequency difference $\Delta\omega$ and the amplitudes of the spectral lines are described by the function $A(\omega)$. By using the known relationship for the Dirac delta function:

$$f(x)\delta(x-a) = f(a)\delta(x-a),$$

one may express $J(\omega)$ in the form:

$$J(\omega) = \sum_{n=-l}^{l} A(\omega_o + n\Delta\omega) \delta(\omega - \omega_o - n\Delta\omega).$$

Since:

$$\text{III}(ax) = \frac{1}{|a|} \sum_{m=-\infty}^{\infty} \delta\left(x - \frac{m}{a}\right)$$

and the convolution of the shah function with an arbitrary function $f(x)$ is:

$$\text{III}(x) * f(x) = \sum_{m=-\infty}^{\infty} f(x-m)$$

then:

$$\text{III}(2d\mu\omega) * S(\omega) = \left[\frac{1}{2\mu d} \sum_{m=-\infty}^{\infty} \delta\left(\omega - \frac{m}{2\mu d}\right)\right] * S(\omega)$$

$$= \frac{1}{2\mu d} \sum_{m=-\infty}^{\infty} S\left(\omega - \frac{m}{2\mu d}\right).$$

Now the integral for $F(d)$ may be evaluated as follows:

$$F(d) = \frac{1}{2\mu d} \int_0^{\infty} J(\omega) \left\{ \sum_{m=-\infty}^{\infty} S\left(\omega - \frac{m}{2\mu d}\right) \right\} d\omega$$

$$= \frac{1}{2\mu d} \left\{ \sum_{n=-l}^{l} A(\omega_o + n\Delta\omega) \int_0^{\infty} \delta(\omega - \omega_o - n\Delta\omega) \left[\sum_{m=-\infty}^{\infty} S\left(\omega - \frac{m}{2\mu d}\right)\right] d\omega \right\}$$

$$= \frac{1}{2\mu d} \sum_{n=-l}^{l} \sum_{m=-\infty}^{\infty} A(\omega_o + n\Delta\omega) S\left(\omega_o + n\Delta\omega - \frac{m}{2\mu d}\right).$$

In order to check the validity of this result, let us set $\Delta\omega=0$. For this case, the input spectrum to the interferometer is a single spectral line at the frequency $\omega_o$. Hence:

$$F(d) = \frac{A(\omega_o)}{2\mu d} \sum_{m=-\infty}^{\infty} S\left(\omega_o - \frac{m}{2\mu d}\right)$$

$$= \frac{A(\omega_o)}{2\mu d} \left[\frac{T^2}{1-R^2}\right] \sum_{m=-\infty}^{\infty} \frac{2\rho}{\rho^2 + (4\pi\mu d)^2 \left(\omega_o - \frac{m}{2\mu d}\right)^2}.$$

This equation has maxima for $\omega_o - m/2\mu d = 0$, or for values of $d$ equal to $m/(2\mu\omega_o)$ where $m$ is an integer. Therefore, the peaks which are transmitted by the FPI have an intensity which is proportional to $A(\omega_o)$ and occur for half wavelength changes in the value of $d$.

For the case $\Delta\omega \neq 0$, we obtain:

$$F(d) = \frac{1}{2\mu d} \sum_{n=-l}^{l} \sum_{m=-\infty}^{\infty} A(\omega_o + n\Delta\omega) S\left(\omega_o + n\omega - \frac{m}{2\mu d}\right)$$

$$= \frac{1}{2\mu d} \left[ \frac{T^2}{1-R^2} \right] \sum_{n=-l}^{l} \sum_{m=-\infty}^{\infty} A(\omega_o + n\Delta\omega) \frac{2\rho}{\rho^2 + (4\pi\mu d)^2 \left( \omega_o + n\Delta\omega - \frac{m}{2\mu d} \right)^2}.$$

The maxima (peaks) occur for $\omega_o + n\Delta\omega - (m/2\mu d) = 0$. Therefore, $$d = m/2\mu(\omega_o + n\Delta\omega)$$

For the sake of simplicity let us consider for the moment only two lines of the periodic spectrum, namely, the lines at $\omega_o$ and $\omega_o + \Delta\omega$. There will be some value of $d$ such that adjacent orders of the FPI will coincide with the spectral lines at $\omega_o$ and $\omega_o + \Delta\omega$. Thus, $$d = \frac{m_1}{2\mu\omega_o} = \frac{m_1 + 1}{2\mu\omega_o + 2\mu\Delta\omega}.$$

Solving for $m_1$, we obtain:

$$m_1 = \omega_o/\Delta\omega$$

Therefore:

$$d = \frac{(\omega_o/\Delta\omega)}{2\mu\omega_o} = \frac{1}{2\mu\Delta\omega}.$$

For this value of $d$, the two spectral lines at $\omega_o$ and $\omega_o + \Delta\omega$ are transmitted simultaneously by the FPI and the resulting fringe intensity is substantially equal to the sum of the intensities for each line. For the case where the periodic spectrum consists of $2l+1$ spectral lines each separated by a frequency difference $\Delta\omega$, there will be simultaneous transmission by the FPI of the $2l+1$ spectral lines for the same value of $d$, namely, $d=1/(2\mu\Delta\omega)$. The resulting fringe intensity will be substantially equal to the sum of the intensities for the $2l+1$ spectral lines.

The condition that $m_1 = \omega_o/\Delta\omega$ must be an integer is necessary to have exact coincidence of the periodic spectra with the FPI comb. However, in practice, $\omega_o >> \Delta\omega$ and $m_1$ is a large number. Since $d=m_1/(2\mu\omega_o)=1/(2\mu\Delta\omega)$, a change in $m_1$ of one or less does not appreciably alter the value of $d$ required for simultaneous transmission of the periodic spectrum. Because of the finite widths of the lines of the periodic spectrum and the transmission windows of the FPI, the periodic spectrum will be transmitted over a small range of $d$ values in the vicinity of $d=1/(2\mu\Delta\omega)$. This fact has been verified for the case of interferometric transmission of a pure rotational Raman spectrum of a gas by a FPI.

In the previous mathematical derivation, an expression for the transmitted intensity of a FPI was derived for an input spectrum consisting of a finite series of equally spaced $\delta$ functions with an envelop profile described by the arbitrary function $A(\omega)$. This particular form of $J(\omega)$ was chosen for the following two reasons. Firstly, the mathematical problem involved in evaluating the integral in the formula for $F(d)$ is greatly simplified by the use of the Dirac $\delta$ function and, secondly, the physical interpretation of the final result regarding the condition for achieving simultaneous transmission by the FPI of all the lines of the periodic spcetrum leads to correct conclusions which have been verified experimentally. If we had chosen a periodic spectrum whose lines had finite widths, the mathematics would become more complicated while the conditions for simultaneous transmission of a periodic spectrum would be the same as that derived by using a periodic spectrum consisting of lines of zero width ($\delta$ functions).

The formulation of the problem using a periodic spectrum whose individual lines have a finite width and profile may be accomplished in the following manner. Let us define the periodic spectrum $J(\omega)$ to be the convolution of a finite Dirac comb with an arbitrary function $D(\omega)$ such that $$J(\omega) = \sum_{n=-l}^{l} \delta(\omega - \omega_o - n\Delta\omega) * D(\omega).$$

In this equation the function $D(\omega)$ describes the spectral shape of the individual lines of the periodic spectrum. Using the previous equation for $F(d)$, we obtain $$F(d) = \frac{1}{2\mu d} \int_0^\infty J(\omega) \left\{ \sum_{m=-\infty}^{\infty} S\left(\omega - \frac{m}{2\mu d}\right) \right\} d\omega$$

$$= \frac{1}{2\mu d} \int_0^\infty \left\{ \sum_{n=-l}^{l} \delta(\omega - \omega_o - n\Delta\omega) * D(\omega) \right\} \left\{ \sum_{m=-\infty}^{\infty} S\left(\omega - \frac{m}{2\mu d}\right) \right\} d\omega$$

$$= \frac{1}{2\mu d} \int_0^\infty \left\{ \sum_{n=-l}^{l} D(\omega - \omega_o - n\Delta\omega) \right\} \left\{ \sum_{m=-\infty}^{\infty} S\left(\omega - \frac{m}{2\mu d}\right) \right\} d\omega.$$

In order to evaluate this integral one must assume a functional form for the line profile $D(\omega)$ and substitute it in the summation. This is a complicated mathematical operation and is not necessary for illustration of the principles described herein.

Due to the form of the transmission function of the FPI and the spectral distribution of the lines of the linear rigid rotor rotational Raman spectrum, a mirror separation, $d$, of $1/8\mu B$ cm, simultaneously passes all of the rotational lines of a particular periodic spectrum. For a given molecular species the rotational constant $B$ is a unique quantity. Thus, identification of the species emitting a particular rotational Raman spectrum can be made positively by determining the mirror separation of the FPI at which all of the rotational Raman lines of the species are simultaneously transmitted. Precise measurements of the mirror separation of the FPI can be obtained using light of known wavelengths from light source means 36 in accordance with the method of fractional orders described by Born and Wolf, Principles of Optics, Third Edition (Permagon, Oxford, 1965) pp. 338–341.

The ability of the FPI to separate the transmission maxima for various scattered molecules depends partly upon the finesse of the instrument and partly upon the interference order of the fringes transmitted. The finesse, $F$, can be described by the formula:

$$F = \Delta f/\delta\omega$$

Where $\Delta f$ is the fringe spacing or spectral range, in cm$^{-1}$ and $\delta\omega$ is the instrumental width of the FPI, defined as the full width of the half intensity points of the transmission profile. Generally, for a FPI operated in the visible wavelength region with mirror separation, $d$, above about several millimeters, the finesse can range about 20–100 and the order of fringes is in excess of 10,000. Resolving powers of from about 1–10 million or more can be attained. Hence, separated transmission maxima can be derived from rotational constants differing by as few as several parts in a thousand.

Advantageously, the throughput of the FPI is considerably greater than that for a spectrometer. The solid angle $\Omega$ of the beam of light that can be sent through the FPI is described by the formula $\Omega = 2\pi/r$ where $r$ is the resolving power. A conventional grating spectrometer has a solid acceptance angle for such light of $\Omega = \beta/2r$ where $\beta$ is the angular length of the spectrometer slit. Hence, the gain, $G$, in luminosity of the FPI over the spectrometer is $G = 4\pi/\beta$. Generally, $\beta$ does not exceed 0.02 radians. Thus, the gain is generally of the order of about $10^2$ to $10^3$, for equal resolving power. Moreover, the signal 18 is derived from a plurality of periodic spectral lines each generally having an intensity considerably greater than that of the species' vibrational spectra. Accordingly, the intensity of the signal 18 is far greater than that obtained by apparatus for measuring vibrational Raman scattering of gaseous material.

As shown in FIG. 2 of the drawings, the transmitted signal 18 is directed back through the primary interferometric means 16 at least one additional time by multipass means 34. One form of multipass means 34 which has been found advantageous is a corner cube prism. Other forms of multipass means 34 can also be used. The first time the signal 18 passes through the primary interferometric means 16, its contrast ratio, C, is described by the formula:

$$C = \left(\frac{I^{(t)}}{I^{(i)}}\right)_{max} \bigg/ \left(\frac{I^{(t)}}{I^{(i)}}\right)_{min} = \left(\frac{1+R}{1-R}\right)^2 = 1 + \frac{4F^2}{\pi^2}$$

where $I^{(t)}$ is the intensity of the fringe pattern, $I^{(i)}$ represents the intensity of the light if the primary interferometric means 16 is not used, $R$ is the reflectivity of the mirror coatings of the primary interferometric means 16 and $F$ is the finesse of the primary interferometric means 16. In the latter equation $F = \pi \sqrt{R}/(1-R)$. With each additional pass of signal 18 through the primary interferometric means 16, the contrast ratio, $C$, is increased. As a result, the contrast ratio is equal to $C^n$ where $n$ is equal to the number of passes of signal 18 through the primary interferometric means 16.

In order to achieve a high contrast ratio using a single passed primary interferometric means 16, the value of the reflectivity $R$ must approach unity. The transmission, $\tau_A$, of the primary interferometric means 16 has a maximum value equal to $$1 - \left(\frac{A}{1-R}\right)^2$$

where $A$ is the absorption coefficient of the mirror surface, and $A = 1-T-R$. However, $\tau_A$ approaches 0 as the value of $(1-R)$ approaches $A$. Hence, if the value of $R$ is increased to produce a high contrast ratio, the transmission, $\tau_A$ of the primary interferometric means 16 is considerably reduced. For a multiple passed primary interferometric means 16, the overall transmission is equal to $(\tau_A)^n$, where $n$ is the number of passes. Accordingly, by multiply passing signal 18 through the primary interferometric means 16 at a lower value of $R$, as in the order of about 0.8–0.9, both a high contrast ratio and a relatively high overall transmission, $\tau_A$, can be simultaneously achieved. For a primary interferometric means 16 having a finesse of 30 and a reflectivity, $R$, of about 0.9, the calculated contrast ratios for from 1 to 3 passes of signal 18 through primary interferometric means 16 are as follows:

| Number of Passes | Contrast Factor |
| --- | --- |
| 1 | 366. |

-continued

| Number of Passes | Contrast Factor |
|---|---|
| 2 | 133,956. |
| 3 | 49,027,896. |

The large contrast ratios achieved by the multiple passing of signal 18 through primary interferometric means 16 significantly reduce the background due to Rayleigh scattering and thereby increase the sensitivity of the apparatus 10.

In the event that light projected by light source means 36 in ray path 38 is plane polarized, a further reduction of the background caused by Rayleigh scattering can be achieved by positioning polarizing means, such as a polarizing element, in light path 14 so as to minimize the transmission of Rayleigh scattered light. With this configuration of the polarizing means, the Rayleigh scattered light passed through the polarizing means is reduced to a degree described by the depolarization ratio thereof. Since the Rayleigh depolarization ratio of light produced by scattering in gases such as oxygen and nitrogen is about 1 percent, the polarizing means operates to reduce the intensity of the Rayleigh light transmitted to the interferometric means by a factor of about 100. The pure rotational Raman scattered light from sample 40 is depolarized and hance passes through the polarizing means with a substantially smaller reduction in intensity, as in the order of about a factor of 2.

A modulating means 42 is associated with the primary interferometric means 16 for modulating the phase difference, $\phi$, so as to vary the intensity of the transmitted fringe. In order to obtain the maximum modulated signal from the fringe appointed for detection, the modulating range is adjusted to approximately ½ the frequency width of the fringe. The modulating range can, alternatively, be resitricted to preselected portions of the fringe in order to increase the intensity of the modulated signal. Generally speaking, the modulating range should be no greater than the frequency spacing between adjacent orders.

The resultant signal 18 from the primary interferometric means 16 is collected and focused in the plane of pinhole stop 44 by a lens 46. Lens 46 is adjusted so that the center of the signal 18 is positioned on the pinhole 48. The intensity of the portion of signal 18 passing through the pinhole 48 is detected by a photomultiplier 50. A phase sensitive detection means 52, such as a lock-in amplifier, is adapted to receive the signal from the photomultiplier 50 and detect the intensity variation of the fringe appointed for analysis. The output of the phase sensitive detection means 52 is displayed by an indicating and recording means 54, which can comprise an oscilloscope and a chart recorder.

In FIG. 3, the primary interferometric means 16 and the modulating means 42 are shown in greater detail. The primary interferometric means shown in a Fabry-Perot Interferometer (FPI) which is scanned by varying the phase difference, $\phi$, between interfering beams of light 14 in a conventional way. Since the phase difference, $\phi$, varies in direct proportion to the product of the optical path, $\mu d$, and the frequency of the input light 14 to be analyzed, the frequency of the input light 14 can be varied instead of the optical path to modulate the phase difference, $\phi$, and alter the intensity of the transmitted fringe. This may be accomplished by use of a light source means such as a tunable dye laser or an optical parametric oscillator. Other scanning methods such as those wherein the pressure of gas between the mirrors of the FPI is altered so as to change the optical path therebetween can also be used. Accordingly, primary interferometric means 16 shown in FIG. 3 should be interpreted as illustrative and not in a limiting sense. Preferably each of the primary and secondary interferometric means 16 and 24 is an FPI and is constructed in the same manner. Thus, the secondary interferometric means 24 is constructed in the same manner as the primary interferometric means 16 described hereinafter in more detail. such means has cylindrical air bearings 56 and 58 which normally operate at about 30 psi and collectively support a hollow metal cylinder 60 approximately 35 cm. long and constructed of stainless steel or the like. The outer diameter of the cylinder 60 is centerless ground to about 4 cm. the inner diameter of the cylinder 60 is about 3.5 cm. Each of the air bearings 56 and 58 is about 8 cm. long and has outer and inner diameters of about 5 cm. and about 4 cm., respectively. The separation between centers of the air bearings is approximately 20 cm. One of the mirrors 62 of the primary interferometric means 16 is fixedly mounted on end 64 of cylinder 60 as by a suitable adhesive or the like. The plane surface of the mirror 62 is substantially perpendicular to the rotational axis of the cylinder. The other mirror 66 is fixedly mounted to the modulating means 42 as hereinafter described. Each of the air bearings 56 and 58 rests in precise v-blocks of a base plate (not shown) treated so as to dampen external vibrations. The light 14 to be analyzed enters the primary interferometric means 16 at end 68 of cylinder 60. A carriage 70 caused to move horizontally by means of a precision screw 72 and having a coupling arm 82 fixedly secured thereto by mechanical fastening means, such as screws 88, and to cylinder 60 as described hereinafter provides the cylinder 60 with the linear motion needed to scan the primary interferometric means 16. Precision screw 72 is coupled to a digital stepping motor 74 through gear assembly 76. The scan rate of the interferometer is controlled either by changing the gear ratio of assembly 76, as by means of magnetic clutches or the like, or by varying the pulse rate input to the digital stepping motor 74. With apparatus of the type described, the scan rate can be varied over a range as great as $10^6$ to 1 or more.

In order to transmit precisely the linear motion to cylinder 60, a collar 78 having glass plate 80 adhesively secured thereto, is fixedly attached to the cylinder 60. The coupling arm 82 has a ball 86 comprised of stainless steel, or the like, associated with an end 84 thereof. A permanent magnet 90 is attached to end 84 of coupling arm 82 near the ball 86. Due to the magnetic attraction between the collar 78 and the magnet 90, the ball is held in contact with the glass plate 80. A low friction contact point is thereby provided. The contact force produced at such contact point by linear movement of the carriage 70 can be adjusted either by varying the separation between the magnet 90 and the collar 78, or by decreasing the strength of the magnet 90.

A sectional view of one form of modulating means 42 is shown in FIG. 3. Other forms of the modulating means 42 can also be used. Preferably, the modulating means 42 has a hollow cylindrical body 92 of piezoelectric ceramics. The inner and outer wall 94 and 96 of the cylindrical body 92 are coated with an electrically conductive material such as silver or the like.

Insulating members 98 and 100 comprised of an insulating material such as ceramic or the like are secured to the cylindrical body 92, at ends 102 and 104, respectively, by a suitable adhesive such as an epoxy resin. Mirror 66 is fixedly attached to insulating member 98 by an adhesive of the type used to secure mirror 62 to the end 64 of cylinder 60. In order that mirror 66 be maintained in parallel with mirror 62, the insulating member 100 is adhesively secured to face 106 of holding member 108. The outer face 110 of the holding member 108 has connected thereto a plurality of differential screw micrometers 112, which can be adjusted in the conventional way to provide for precise angular alignment of the mirror 66. Electrodes 114 and 116 are attached to the inner wall 94 and the outer wall 96, respectively. Voltage having a wave form such as a sine wave or a square wave impressed thereon is applied from a high voltage low current power supply 101 to the electrodes 114 and 116. Upon application of the voltage the cylindrical body 92 is caused to modulate in a linear direction, whereby the intensity of signal 18 is varied. When the voltage applied from power supply 101 to electrodes 114 and 116 has the form of a square wave, the voltage limits of the wave form can be adjusted so that the intensity of the fringe to be detected from signal 18 alternates between its maximum and minimum values. A synchronous detection means is provided for determining the difference in photon count between the maximum and minimum values of the fringe for each cycle of the square wave to produce a signal count and accumulating the signal count for a preselected period of time over a preselected number of cycles of the square wave, the preselected time period and preselected number of cycles varying inversely with the intensity of said fringe. As a result, the accuracy of the detecting means and hence the sensitivity of the apparatus 10 is increased by a factor in the order of about 100 or more.

The apparatus 10 which has been disclosed herein can, of course, be modified in numerous ways without departing from the scope of the invention. For example, each of the primary and secondary interferometric means 16 and 24 can be a fixed etalon tuned by controlling the temperature thereof. One type of fixed etalon which is suitable is comprised of optically transparent material, such as fused silica, having opposed surfaces which are polished, flat, parallel and coated with silver, dielectric material or the like for high reflectivity at a preselected frequency region. The thickness of the etalon for the primary interferometric means can be chosen so that the free spectral range of the etalon corresponds approximately to an odd integral submultiple of the frequency difference between spectral components of a given periodic spectrum, the odd integral submultiple being at least 3. Fine tuning of the solid etalon for the primary interferometric means is affected by providing means for controlling the temperature, and hence the optical path length, thereof so as to cause the transmission peaks for adjacent nth orders to coincide with the components of the given periodic spectrum. The number of secondary interferometric means 24 employed can vary from as few as 1 to as many as 10 or more. The secondary etalons can be arranged in series so that each etalon in turn receives the light 14, selectively separates preselected spectra therefrom and sends the remaining light 14, devoid of such spectra, to the next etalon. Spectra respectively separated from the light 14 by the secondary etalons can be identified simultaneously by detecting means associated with each etalon. As previously noted, the light 14 to be analyzed need not be Raman scattered light solely but can be any light from the visible, infrared or ultraviolet frequency regions which has spectral components periodic in frequency. The secondary interferometric means 24, the signal conditioning means 30 and the multipass means 34 can be separately combined with the apparatus, although their collective employment results in maximum sensitivity and is therefore preferred. Moreover, the increased sensitivity of the apparatus makes it especially suited for detection at distant locations of gaseous constituents present in low parts per million range. Hence, the gaseous material need not be located within a sample compartment, but may instead be located at points distant from the apparatus 10, as in the order of up to about 5 miles distance therefrom. Other similar modifications can be made which fall within the scope of the present invention. It is, accordingly, intended that all matter contained in the above description and shown in the accompanying drawings be interpreted as illustrative and not in a limiting sense.

In operation of the preferred apparatus, light 14 having spectral components periodic in frequency is collected, collimated and transmitted by light conditioning means 12 to secondary interferometric means 24. The secondary interferometric means 24 receives the light 14, selectively separates therefrom preselected periodic spectra, and sends the light devoid of the separated spectra to the primary interferometric means 16. A secondary detecting means 28 receives the separated spectra which are transmitted from the secondary interferometric means 24 in the form of a fringe and determines the intensity thereof. The primary interferometric means 16 receives the light 14, transmits the periodic spectral components in the form of a fringe which provides a detectable signal 18. A multipass means 34 associated with the primary interferometric means 16 directs the signal back through the primary interferometric means one or more times, whereby the contrast ratio of the signal is increased. A modulating means 42 operates to modulate the phase difference of the primary interferometric means so as to vary the intensity of the fringe. The intensity variation of the fringe is detected by a phase sensitive detection means 52. The resultant signal from the phase sensitive detection means 52 is displayed by the indicating and recording means 54.

Having thus described the invention in rather full detail, it will be understood that these details need not be strictly adhered to but that various changes and modifications may suggest themselves to one skilled in the art, all falling within the scope of the present invention as defined by the subjoined claims.

I claim:

1. Apparatus for analyzing light having spectral components periodic in frequency comprising:
    a. light conditioning means for collecting, collimating and transmitting said light; and
    b. primary interferometric means adapted to receive said light and transmit said periodic spectral components in the form of a detectable signal, said primary interferometric means having interference-producing means for providing a plurality of transmission windows regularly spaced in frequency, the frequency spacing between adjacent windows being adjusted to equal substantially an odd integral submultiple, $n$, of the frequency difference between adjacent spectral components of the same periodic spectrum, said odd integral submultiple being at least 3, and scanning means for causing the transmission peaks for adjacent nth orders to coincide with the spectral lines of the components, whereby said detectable signal is a fringe derived in part from the conbined intensities of said periodic spectral lines.

2. Apparatus for measuring rotational Raman spectra of gaseous material comprising:
   a. light source means for generating monochromatic light;
   b. projecting means for directing said monochromatic light through said gaseous material to produce scattered light having spectral components periodic in frequency;
   c. light conditioning means for collecting, collimating and transmitting said scattered light;
   d. primary interferometric means adapted to receive said scattered light and transmit said periodic spectral components in the form of a detectable signal, said primary interferometric means having interference-producing means for providing a plurality of transmission windows regularly spaced in frequency, the frequency spacing between adjacent windows being adjusted to equal substantially an odd integral submultiple, $n$, of the frequency difference between adjacent spectral components of the same periodic spectrum, said odd integral submultiple being at least three, and scanning means for causing the transmission peaks for adjacent nth orders to coincide with the spectral lines of the components, whereby said detectable signal is a fringe derived in part from the combined intensities of said periodic spectral lines; and
   e. detecting means for indicating the intensity of said signal.

3. Apparatus for analyzing light having spectral components periodic in frequency, comprising:
   a. light conditioning means for collecting, collimating and transmitting said light;
   b. primary interferometric means adapted to receive said light and transmit said periodic spectral components in the form of a detectable signal, said primary interferometric means having interference producing means for providing a plurality of transmission windows regularly spaced in frequency, the frequency spacing between adjacent windows being adjusted to equal substantially an odd integral submultiple, $n$, of the frequency difference between adjacent spectral components of the same periodic spectrum, said odd integral submultiple being at least three, and scanning means for causing the transmission peaks for adjacent nth orders to coincide with the spectral lines of the components, whereby said detectable signal is a fringe derived in part from the combined intensities of said periodic spectral lines; and
   c. signal conditioning means including:
      1. modulating means for modulating the phase difference between interfering rays of said light so as to vary the intensity of the fringe, the modulating range being no greater than the frequency spacing between adjacent orders; and
      2. synchronous detection means for detecting the intensity variation of the fringe, whereby said fringe can be identified.

4. Apparatus as recited in claim 3 wherein said modulating means has a modulating range of about ½ the frequency width of said fringe.

5. Apparatus as recited in claim 3 including indicating and recording means for displaying said signal.

6. Apparatus as recited in claim 3 wherein said modulating means is a piezoelectric cylinder and said synchronous detection means is a phase sensitive detection system.

7. Apparatus as recited in claim 3 including secondary interferometric means in series with and between said light conditioning means and said primary interferometric means for receiving said light, selectively separating preselected spectra therefrom and sending said light devoid of said separated spectra to said primary interferometric means for receiving said light, selectively separating preselected spectra therefrom and sending said light devoid of said separated spectra to said primary interferometric means, said secondary interferometric means having interference-producing means for providing a plurality of transmission windows regularly spaced in frequency, the frequency spacing between adjacent windows being adjusted to substantially equal the frequency difference between adjacent spectral components of the periodic spectrum for the preselected spectra, and scanning means for causing the transmission peaks for adjacent windows of said secondary interferometric means to coincide with the spectral lines of the latter components.

8. Apparatus for analyzing light having spectral components periodic in frequency, comprising:
   a. light conditioning means for collecting, collimating and transmitting said light;
   b. primary interferometric means adapted to receive said light for selectively separating periodic spectra therefrom and transmitting said spectra in the form of a detectable signal, said primary interferometric means having interference-producing means for providing a plurality of transmission windows regularly spaced in frequency, the frequency spacing between adjacent windows being adjusted to equal substantially an odd integral submultiple, $n$, of the frequency difference between spectral components of the same periodic spectrum, said odd integral submultiple being at least 3, and scanning means for causing the transmission peaks for adjacent nth orders to coincide with the spectral lines of the components, whereby said detectable signal is a fringe derived in part from the combined intensities of said periodic spectral lines; and
   c. secondary interferometric means in series with and between said light conditioning means and said primary interferometric means for receiving said light, selectivity separating preselected spectra therefrom and sending said light devoid of said separated spectra to said primary interferometric means, said secondary interferometric means having interference-producing means for providing a plurality of transmission windows regularly spaced in frequency, the frequency spacing between adjacent windows of said interferometric means being adjusted to substantially equal the frequency difference between adjacent spectral components of the periodic spectrum for the preselected spectra and scanning means for causing the transmission peaks for adjacent orders of said secondary interferometric means to coincide with the spectral lines of latter components.

9. Apparatus as recited in claim 8 including multipass means for directing said detectable signal through said primary interferometric means, whereby the contrast ratio of said signal is increased.

10. Apparatus for analyzing light having spectral components periodic in frequency, comprising:
   a. light conditioning means for collecting, collimating and transmitting said light;
   b. primary interferometric means adapted to receive said light for selectively separating periodic spectra therefrom and transmitting said spectra in the form of a detectable signal, said primary interferometric means having interference-producing means for providing a plurality of transmission windows regularly spaced in frequency, the frequency spacing between adjacent windows being adjusted to substantially equal an odd integral submultiple, $n$, of the frequency difference between spectral components of the same periodic spectrum, said odd integral submultiple being at least three, and scanning means for causing the transmission peaks for adjacent $n$th orders to coincide with the spectral lines of the components, whereby said detectable signal is a fringe derived in part from the combined intensities of said periodic spectral lines; and
   c. multipass means for directing said detectable signal through said primary interferometric means whereby the contrast ratio of said signal is increased.

11. Apparatus as recited in claim 10 wherein said multipass means is a corner cube prism.

12. Apparatus as recited in claim 10 including signal conditioning means comprising modulating means for modulating the phase difference between interfering rays of said light so as to vary the intensity of the fringe, the modulating range being no greater than the frequency spacing between adjacent orders, and phase sensitive detection means for detecting the intensity variation of the fringe, whereby said fringe can be identified.

13. Apparatus as recited in claim 2 wherein said light source means is provided with means for projecting light having a line width and frequency stability about equal to or less than the instrumental width of said primary interferometric means.

14. Apparatus as recited in claim 2 wherein said light source means is a pulsed laser.

15. Apparatus as recited in claim 14 wherein said laser is associated with a time gated electronic detection system having (1) means for measuring the time interval required to send a pulse from said laser into a sample of gaseous material and receive a return signal caused by light scattered therein and (2) means for measuring the amplitude of said return signal.

16. Apparatus as recited in claim 8 including detecting means associated with said secondary interferometric means for receiving therefrom a signal containing said preselected spectra and measuring the amplitude of said signal.

17. Apparatus as recited in claim 16 wherein said preselected spectra are the spectra produced by Raman scattering of a major constituent of a gaseous material.

18. Apparatus as recited in claim 17 wherein said gaseous material is air.

19. Apparatus as recited in claim 2 wherein said light source means is adapted to project plane polarized light and said apparatus includes polarizing means for receiving said scattered light and transmitting the light to said interferometric means.

20. Apparatus as recited in claim 19 wherein said polarizing means is adapted to reduce the intensity of polarized Rayleigh scattered light to a degree described by the depolarization ratio thereof and to reduce the intensity of the Raman scattered light to a substantially smaller degree.

21. Apparatus as recited in claim 1 wherein said primary interferometric means is a solid etalon having temperature control means associated therewith for adjusting the optical path length thereof.

22. Apparatus as recited in claim 8 wherein at least one of said primary and secondary interferometric means is a solid etalon having temperature control means associated therewith for adjusting the optical path length thereof.

23. Apparatus as recited in claim 6 including means for applying to said cylinder a voltage having a square wave form, the limits of said voltage being adjusted so that the intensity of said fringe alternates between its maximum and minimum values, means for determining for each cycle of said voltage the difference in photon count between said maximum and minimum values of said fringe to produce a signal count, and means for accumulating said signal count for a preselected period of time over a preselected number of cycles of said square wave.

24. Apparatus as recited in claim 23 including means for varying the preselected time period and the preselected number of cycles inversely with the intensity of said fringe.

25. Apparatus as recited in claim 6 wherein said phase sensitive detection system is a lock-in amplifier.

26. Apparatus as recited in claim 3 wherein said modulating means is a piezoelectric cylinder and said synchronous detection means is a photon counting system.

27. Apparatus as recited in claim 1 wherein $n$ has a magnitude such that the frequency spacing between adjacent windows of said interferometric means is at least twice as large as the average full width at half intensity points of said periodic spectral components.

28. Apparatus as recited in claim 2, wherein said light source means includes signal conditioning means for varying the frequency of said monochromatic light to modulate the phase difference between interfering rays of said scattered light and vary the intensity of said modified fringe.

29. Apparatus as recited in claim 28, wherein said light source means is a tunable dye laser or an optical parametric oscillator.

30. A method of analyzing light having spectral components periodic in frequency, comprising the steps of:
   a. collecting, collimating and transmitting said light in the form of a ray path;
   b. interferometrically separating periodic spectra from said light by directing said light through a plurality of transmission windows regularly spaced in frequency, the frequency spacing between adjacent windows being equal substantially to an odd integral submultiple, $n$, of the frequency difference between adjacent spectral components of the same periodic spectrum, said odd integral submultiple being greater than 1; and scanning said ray path to cause the transmission peaks for adjacent nth orders to coincide with the spectral lines of the components; and c. transmitting said separated spectra in the form of a detectable signal, said signal being a fringe derived from a plurality of periodic spectral lines and having an intensity substantially equal to their sum.

31. A method as recited in claim 30, including the steps of modulating the phase difference between interfering rays of said light so as to vary the intensity of the fringe, the modulating range being no greater than the frequency spacing between adjacent orders, and detecting the intensity variation of the fringe.

32. A method as recited in claim 30, including the steps of selectively separating preselected spectra from said light and transmitting said light devoid of said separated spectra prior to the step of interferometrically separating periodic spectra from said light.

33. Apparatus for analyzing light having spectral components periodic in frequency comprising:

a. light conditioning means for collecting, collimating and transmitting said light; and b. primary interferometric means adapted to receive said light and transmit said periodic spectral components in the form of a detectable signal, said primary interferometric means having interference-producing means for providing a plurality of transmission windows regularly spaced in frequency, the frequency spacing between adjacent windows being adjusted to substantially equal the product of the frequency difference between adjacent spectral components of the same periodic spectrum and the factor $n'$ where $n'$ is an integer of at least two and scanning means for causing the transmission peaks for adjacent orders to coincide with adjacent $n'$ spectral lines of the components, whereby said detectable signal is a fringe derived from a plurality of periodic spectral lines and has an intensity substantially equal to their sum.

34. Apparatus as recited in claim 33, including detecting means for indicating the intensity of said signal.

35. Apparatus as recited in claim 33, including signal conditioning means comprising modulating means for modulating the phase difference between interfering rays of said light so as to vary the intensity of the fringe, the modulating range being no greater than the product of $1/n'$ and the frequency spacing between adjacent orders, and phase sensitive detection means for detecting the intensity variation of the fringe, whereby the fringe can be identified.

36. Apparatus as recited in claim 35 wherein said modulating means has a modulating range of about ½ the frequency width of said fringe.

37. Apparatus as recited in claim 35 including indicating and recording means for displaying said signal.

38. Apparatus as recited in claim 35 wherein said modulating means is a piezoelectric cylinder and said synchronous detection means is a phase sensitive detection system.

39. Apparatus as recited in claim 35, including multipass means for directing said detectable signal through said primary interferometric means, whereby the contrast ratio of said signal is increased.

40. Apparatus as recited in claim 39 wherein said multipass means is a corner cube prism.

41. Apparatus as recited in claim 35, including secondary interferometric means in series with and between said light conditioning means and said primary interferometric means for receiving said light, selectively separating preselected spectra therefrom and sending said light devoid of said separated spectra to said primary interferometric means, said secondary interferometric means having interference-producing means for providing a plurality of transmission windows regularly spaced in frequency, the frequency spacing between adjacent windows being adjusted to substantially equal the frequency difference between adjacent spectral components of the periodic spectrum for the preselected spectra, and scanning means for causing the transmission peaks for adjacent windows of said secondary interferometric means to coincide with the spectral lines of the latter components.

42. Apparatus as recited in claim 33, including light source means for generating monochromatic light and projecting means for directing said monochromatic light through gaseous material to produce scattered light having said spectral components periodic in frequency.

43. Apparatus as recited in claim 42, wherein said light source means includes signal conditioning means for varying the frequency of said monochromatic light to modulate the phase difference between interfering rays of said scattered light and vary the intensity of said fringe.

44. Apparatus as recited in claim 43, wherein said light source means is a tunable dye laser or an optical parametric oscillator.

45. Apparatus as recited in claim 42 wherein said light source means is provided with means for projecting light having a line width and frequency stability about equal to or less than the instrumental width of said primary interferometric means.

46. Apparatus as recited in claim 42 wherein said light source means is a pulsed laser.

47. Apparatus as recited in claim 46 wherein said laser is associated with a time gated electronic detection system having (1) means for measuring the time interval required to send a pulse from said laser into a sample of gaseous material and receive a return signal caused by light scattered therein and (2) means for measuring the amplitude of said return signal.

48. Apparatus as recited in claim 41 including detecting means associated with said secondary interferometric means for receiving therefrom a signal containing said preselected spectra and measuring the amplitude of said signal.

49. Apparatus as recited in claim 48 wherein said preselected spectra are the spectra produced by Raman scattering of a major constituent of a gaseous material.

50. Apparatus as recited in claim 49 wherein said gaseous material is air.

51. Apparatus as recited in claim 42 wherein said light source means is adapted to project plane polarized light and said apparatus includes polarizing means for receiving said scattered light transmitting the light to said interferometric means.

52. Apparatus as recited in claim 51 wherein said polarizing means is adapted to reduce the intensity of polarized Rayleigh scattered light to a degree described by the depolarization ratio thereof and to reduce the intensity of the Raman scattered light to a substantially smaller degree.

53. Apparatus as recited in claim 33 wherein said primary interferometric means is a solid etalon having temperature control means associated therewith for adjusting the optical path length thereof.

54. Apparatus as recited in claim 41 wherein at least one of said primary and secondary interferometric means is a solid etalon having temperature control means associated therewith for adjusting the optical path length thereof.

55. Apparatus as recited in claim 38 including means for applying to said cylinder a voltage having a square wave form, the limits of said voltage being adjusted so that the intensity of said fringe alternates between its maximum and minimum values, means for determining for each cycle of each voltage the difference in photon count between said maximum and minimum values of said fringe to produce a signal count, and means for accumulating said signal count for a preselected period of time over a preselected number of cycles of said square wave.

56. Apparatus as recited in claim 55 including means for varying the preselected time period and the preselected number of cycles inversely with the intensity of said fringe.

57. Apparatus as recited in claim 38 wherein said phase sensitive detection system is a lock-in amplifier.

58. Apparatus for analyzing light having spectral components periodic in frequency, comprising:
  a. light conditioning means for collecting, collimating and transmitting said light;
  b. primary interferometric means adapted to receive said light and transmit said periodic spectral components in the form of a detectable signal, said primary interferometric means having interference-producing means for providing a plurality of transmission windows regularly spaced in frequency, the frequency spacing between adjacent windows being adjusted to substantially equal the product of the frequency difference between adjacent spectral components of the same periodic spectrum and the factor $n/2$, where $n$ is an odd integer of at least three, and scanning means for causing the transmission peaks for alternate orders to coincide with adjacent $n$ th spectral lines of the components, whereby said detectable signal is a fringe derived from a plurality of periodic spectral lines and having an intensity substantially equal to their sum.

59. Apparatus as recited in claim 58, including detecting means for indicating the intensity of said signal.

60. Apparatus as recited in claim 58, including signal conditioning means comprising modulating means for modulating the phase difference between interfering rays of said light so as to vary the intensity of said fringe, the modulating range being no greater than the product of $1/n$ and the frequency spacing between adjacent orders, and synchronous detection means for detecting the intensity variation of the fringe, whereby the fringe can be identified.

61. Apparatus as recited in claim 60 wherein said modulating means has a modulating range of about ½ the frequency width of said modified fringe.

62. Apparatus as recited in claim 60, including indicating and recording means for displaying said signal.

63. Apparatus as recited in claim 60 wherein said modulating means is a piezoelectric cylinder and said synchronous detection means is a phase sensitive detection system 64. Apparatus as recited in claim 58, including multipass means for directing said detectable signal through said primary interferometric means, whereby the contrast ratio of said signal is increased.

65. Apparatus as recited in claim 64 wherein said multipass means is a corner cube prism.

66. Apparatus as recited in claim 58, including secondary interferometric means in series with and between said light conditioning means and said primary interferometric means for receiving said light, selectively separating preselected spectra therefrom and sending said light devoid of said separated spectra to said primary interferometric means, said secondary interferometric means having interference-producing means for providing a plurality of transmission windows regularly spaced in frequency, the frequency spacing between adjacent windows being adjusted to substantially equal the frequency difference between adjacent spectral components of the periodic spectrum for the preselected spectra, and scanning means for causing the transmission peaks for adjacent windows of said secondary interferometric means to coincide with the spectral lines of the latter components.

67. Apparatus as recited in claim 58, including light source means for generating monochromatic light and projecting means for directing said monochromatic light through gaseous material to produce scattered light having said spectral components periodic in frequency.

68. Apparatus as recited in claim 67, wherein said light source means includes signal conditioning means for varying the frequency of said monochromatic light to modulate the phase difference between interfering rays of said scattered light and vary the intensity of said fringe.

69. Apparatus as recited in claim 68 wherein said light source means is a tunable dye laser or an optical parametric oscillator.

70. Apparatus as recited in claim 67 wherein said light source means is provided with means for projecting light having a line width and frequency stability about equal to or less than the instrumental width of said primary interferometric means.

71. Apparatus as recited in claim 67 wherein said light source means is a pulsed laser.

72. Apparatus as recited in claim 71 wherein said laser is associated with a time gated electronic detection system having (1) means for measuring the time interval required to send a pulse from said laser into a sample of gaseous material and receive a return signal caused by light scattered therein and (2) means for measuring the amplitude of said return signal.

73. Apparatus as recited in claim 66 including detecting means associated with said secondary interferometric means for receiving therefrom a signal containing said preselected spectra and measuring the amplitude of said signal.

74. Apparatus as recited in claim 73 wherein said preselected spectra are the spectra produced by Raman scattering of a major constituent of a gaseous material.

75. Apparatus as recited in claim 74 wherein said gaseous material is air.

76. Apparatus as recited in claim 67 wherein said light source means is adapted to project plane polarized light and said apparatus includes polarizing means for receiving said scattered light and transmitting the light to said interferometric means.

77. Apparatus as recited in claim 76 wherein said polarizing means is adapted to reduce the intensity of polarized Rayleigh scattered light to a degree described by the depolarization ratio thereof and to reduce the intensity of the Raman scattered light to a substantially smaller degree.

78. Apparatus as recited in claim 58 wherein said primary interferometric means is a solid etalon having temperature control means associated therewith for adjusting the optical path length thereof.

79. Apparatus as recited in claim 66 wherein at least one of said primary and secondary interferometric means is a solid etalon having temperature control means associated therewith for adjusting the optical path length thereof.

80. Apparatus as recited in claim 63 including means for applying to said cylinder a voltage having a square wave form, the limits of said voltage being adjusted so that the intensity of said fringe alternates between its maximum and minimum values, means for determining for each cycle of said voltage the difference in photon count between said maximum and minimum values of said fringe to produce a signal count, and means for accumulating said signal count for a preselected period of time over a preselected number of cycles of said square wave.

81. Apparatus as recited in claim 80 including means for varying the preselected time period and the preselected number of cycles inversely with the intensity of said fringe.

82. Apparatus as recited in claim 63 wherein said phase sensitive detection system is a lock-in amplifier.

* * * * *

UNITED STATES PATENT AND TRADEMARK OFFICE
CERTIFICATE OF CORRECTION

PATENT NO. : 3,999,854
DATED : December 28, 1976
INVENTOR(S) : Joseph J. Barrett It is certified that error appears in the above—identified patent and that said Letters Patent are hereby corrected as shown below:

Col. 1, line 44, "gaseoud" should read --gaseous--

Col. 2, line 17, "spearating" should read --separating--

Col. 3, line 6, "a" should read --A--

*Col. 5, line 60, "niterogen" should read --nitrogen-- line 62, "sprctral" should read --spectral-- line 65, "te" should read --the--

Col. 6, line 40, "chosed" should read --chosen--

Col. 9, line 2, after "means" insert --16--

Col. 12, line 64, "nw" should read --n$\Delta$w--

Col. 13, line 11 "$w_c$" should read --$w_o$-- line 11, after "$w_o$" insert --+-- line 11, after "m/2ud" insert --)-- line 14, after "($w_o$ + n$\Delta$w)" insert --.--

UNITED STATES PATENT AND TRADEMARK OFFICE
CERTIFICATE OF CORRECTION

PATENT NO. : 3,999,854
DATED : December 28, 1976
INVENTOR(S) : Joseph J. Barrett It is certified that error appears in the above-identified patent and that said Letters Patent are hereby corrected as shown below:

Col. 13, line 27, after "$\Delta w$" insert --.--

Col. 14, line 34, "conditions" should read --condition--

Col. 17, line 28, "hance" should read --hence-- line 39, "resitricted" should read --restricted--

Col. 18, line 14, "such" should read --Such-- line 19, "the" should read --The--

Col. 25, line 36, "n'" should read --n'th--

Col. 26, line 57, after "light" , first occurrence, insert -- and --.

Col. 27, line 11, "each" should read --said--

UNITED STATES PATENT OFFICE
CERTIFICATE OF CORRECTION

Patent No. 3,999,854  Dated December 28, 1976

Inventor(s) Joseph J. Barrett  Page 3 of 3

It is certified that error appears in the above-identified patent and that said Letters Patent are hereby corrected as shown below:

Col. 27, line 37, "n/2," should read -- n"/2, --.

line 37, "n" should read -- n" --.

line 40, "nth" should read -- n"th --.

line 52, "1/n" should read -- 1/n" --.

Signed and Sealed this

Seventeenth Day of May 1977

[SEAL]

Attest:

RUTH C. MASON  
Attesting Officer

C. MARSHALL DANN  
Commissioner of Patents and Trademarks